United States Patent [19]

Ohsawa

[11] Patent Number: 5,546,157
[45] Date of Patent: Aug. 13, 1996

[54] FOCUS STATE DETECTION DEVICE

[75] Inventor: Keiji Ohsawa, Tokyo, Japan

[73] Assignee: Nikon Corporation, Tokyo, Japan

[21] Appl. No.: 363,819

[22] Filed: Dec. 27, 1994

[30] Foreign Application Priority Data

Dec. 27, 1993 [JP] Japan ................... 5-330454

[51] Int. Cl.$^6$ ................................. G03B 13/36
[52] U.S. Cl. ........................................ 354/406
[58] Field of Search ........................ 354/402, 406, 354/407, 408; 250/201.2, 201.8, 201.7

[56] References Cited

U.S. PATENT DOCUMENTS 4,857,718  8/1989  Karasaki et al. .
5,138,359  8/1992  Nagano et al. .............. 354/406
5,227,833  7/1993  Ishida et al. ................ 354/402

FOREIGN PATENT DOCUMENTS

62-189415  9/1987  Japan .
4-422      1/1992  Japan .

Primary Examiner—W. B. Perkey
Attorney, Agent, or Firm—Oliff & Berridge

[57] ABSTRACT

A focus detection device includes a sensor for detecting focus in at least two regions of an image field. The device further includes a photographic lens for receiving light from a source in the image field, and a field lens for receiving light from the photographic lens. The field lens is disposed between the photographic lens and the sensor, and includes a plurality of field lens elements for receiving light from the regions of the image field. At least two of the field lens elements are adjacent field lens elements corresponding to adjacent regions of the image field. The adjacent field lens elements are separated by a space to deflect stray light. A method of use also is described.

16 Claims, 6 Drawing Sheets

FOCUS STATE DETECTION DEVICE

BACKGROUND OF THE INVENTION

1. Field of the Invention

The present invention relates to a focus state detection device, and more particularly, to a focus state detection device adapted for use in a camera and capable of detecting focus condition in a plurality of focus detecting areas.

2. Description of Related Art

A known focus state detection device is capable of detecting focus condition in a plurality of focus detecting areas. Focus condition can be detected simultaneously not only in the area around the optical axis of the photographic lens but also in areas off the optical axis. Such a device is a modification of a known optical system used for detecting focus condition that detects focus condition in only one area. Only the number of areas is increased.

Figure 8:
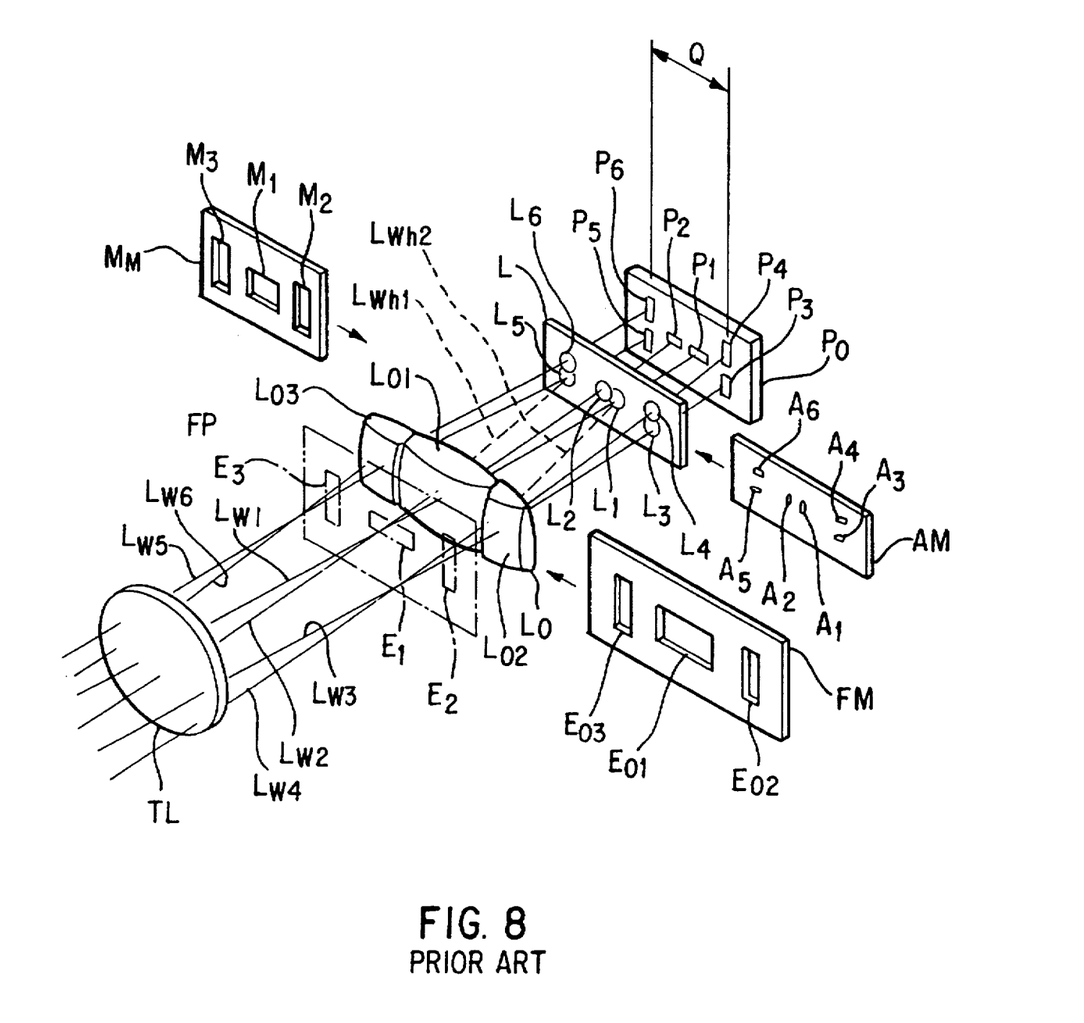
FIG. 8 is a perspective view showing a conventional focus state detection device.

The difficulties created with such a system and the method of resolving such difficulties are discussed in Japanese Publication No. 63-289513, corresponding to U.S. Pat. No. 4,857,718. FIG. 8 corresponds to an embodiment of a device described in the 718 Patent. The device detects focus condition in a total of three locations, namely, in an area on the optical axis of the photographic lens and in two areas not on the optical axis. The positioning of these areas, as indicated on focal plane FP of photographic lens TL, is such that areas E2 and E3 extend in the vertical direction and are not on the optical axis. Areas E2 and E3 surround area E1, which extends in the horizontal direction and is on the optical axis.

In each of these areas, two light rays (LW1, LW2), (LW3, LW4) and (LW5, LW6) pass through different regions of photographic lens TL, pass through field lenses L01–L03, and are composed as images on light-receiving areas (P1, P2), (P3,P4) and (P5,P6) of CCD line sensor P0 by three pairs of re-imaging lenses (L1,L2), (L3,L4) and (L5,L6). The focus position of photographic lens TL in each area is detected from the position of the images.

With this type of plural focus detecting system, field lenses L01–L03 and re-imaging lenses (L1,L2), (L3,L4) and (L5,L6) normally are single entities (i.e., one-piece units), as shown in FIG. 8, to conserve space and materials.

Field mask FM has apertures E01–E03 that restrict the range of the area where focus condition is detected. Field mask FM is immediately in front of field lens L0, which comprises three lenses L01–L03 formed as a single entity. Mask AM has apertures (A1,A2), (A3,A4) and (A5,A6), which restrict the range where the light rays used for focus detecting pass through the exit pupil of photographic lens TL after being projected to the exit pupil by the field lenses L01–L03. Mask AM is placed in front of re-imaging lens L, which comprises the three pairs of lenses (L1,L2), (L3,L4) and (L5,L6) formed as a single entity. The focus state detection optical system in one of the areas, such as the area E1 on the optical axis, for example, comprises aperture E01 in field mask FM, field lens L01, a pair of apertures (A1,A2) in mask AM, and a pair of light-receiving areas (P1,P2) of CCD line sensor P0. The number of focus state detection optical systems agrees with the number of focus detecting areas.

With focus state detection devices equipped with a plurality of focus state detection optical systems, the light rays used for each focus detection become closer to each other as CCD line sensor P0 is made smaller, that is, as distance Q in FIG. 8 is made smaller, to make the device more compact.

A problem arises in that light rays from areas not corresponding to a particular light-receiving area can be incident upon that light-receiving area in the CCD line sensor. This harmful stray light, indicated in FIG. 8 by dashed lines LWh1 and LWh2, causes the precision of focus state detection to drop.

To solve this problem, in U.S. Pat. No. 4,857,718, a blocking material MM has three apertures M1–M3, through which light rays for focus detecting can pass. Blocking material MM is positioned between field lens L0 and re-imaging lens L to block stray light rays.

Figure 7:
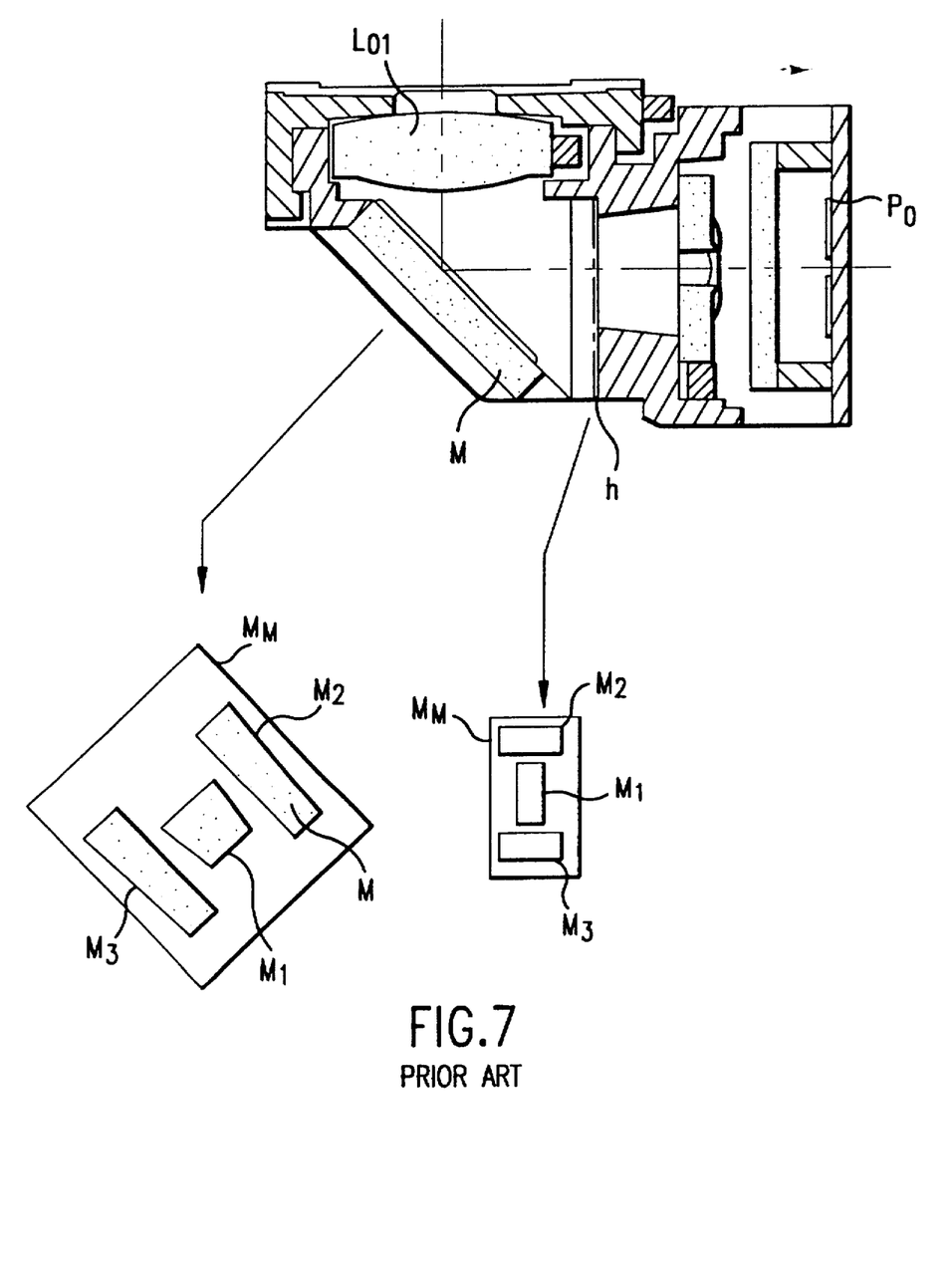
FIG. 7 is a cross-sectional view showing positioning of a light-blocking plate in a focus state detection device capable of detecting focus condition in a plurality of focus detecting areas.

FIG. 7 shows positioning of stray light-blocking material MM of U.S. Pat. No. 4,857,718 with a focus state detection device mounted in a camera. Deflecting mirror M is between field lens L0 and re-imaging lens L so that the camera is not excessively large. Light rays for focus detecting are deflected nearly perpendicular to the direction of the photographic lens, to efficiently use space in the camera. In U.S. Pat. No. 4,857,718, blocking material MM is either positioned to be perpendicular to the optical axis of the light rays for focus detecting at position h, between re-imaging lens L and bending mirror M, or is adhered to the top surface of deflecting mirror M.

Figure 4:
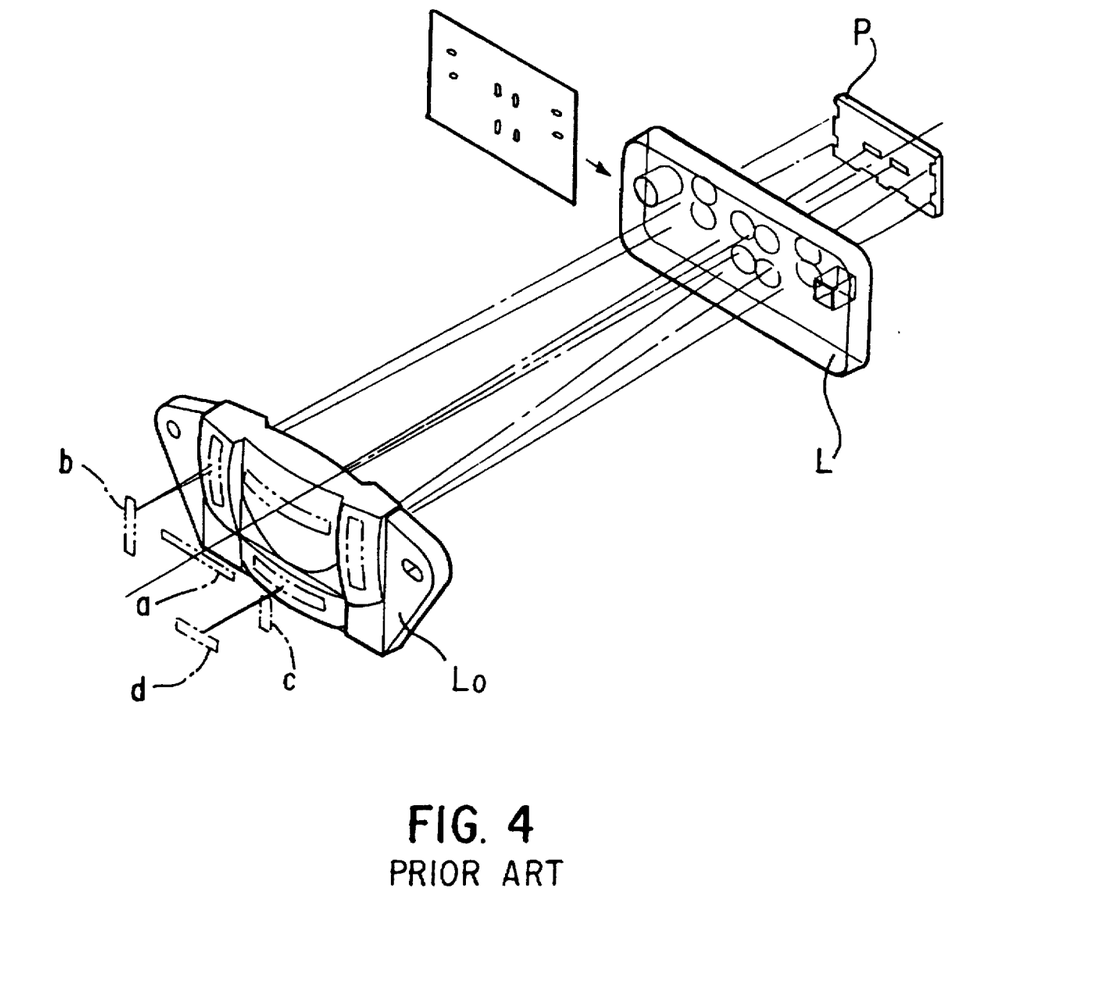
FIG. 4 is a perspective view showing a focus state detection device capable of detecting focus condition in plural focus detecting areas.

Additionally, a focus state detection device capable of focus detecting in plural focus detecting areas is disclosed in Japanese Publication No. Hei 4-422. Focus detecting areas not on the optical axis are arranged not only to the left and right of the axis, but also at the top of the screen, above the axis. This arrangement is shown in FIG. 4. In addition to central area a on the optical axis and areas b and c to the left and right of the optical axis, area d to the top and not on the optical axis also is provided. Field lens L0, re-imaging lens L and CCD line sensor P are formed so that all components corresponding to each area are comprised of a single entity.

Figure 5:
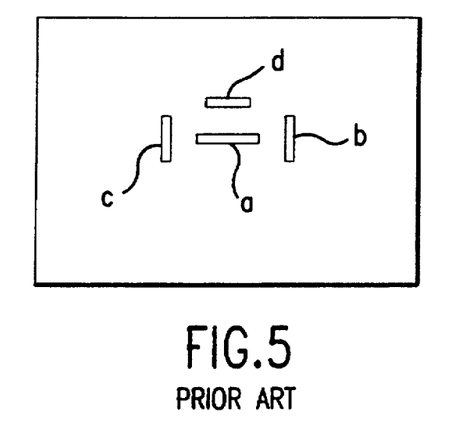
FIG. 5 is another drawing showing an arrangement of focus detecting areas in a focus state detection device capable of detecting focus condition in a plurality of focus detecting areas.
Figure 6:
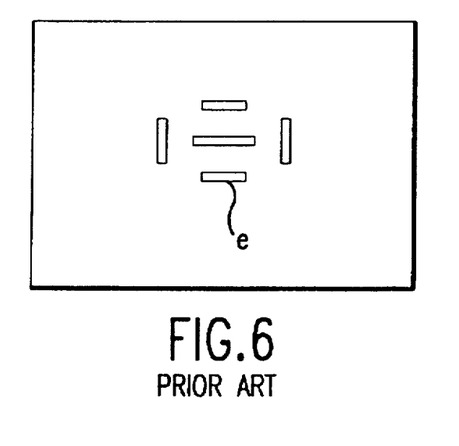
FIG. 6 is another drawing showing an arrangement of focus detecting areas in a focus state detection device capable of detecting focus condition in a plurality of focus detecting areas.

The arrangement of the areas in the optical system is shown in FIG. 5. Area d is parallel to central area a on the optical axis, both areas extending horizontally on the screen. In addition, an area also is provided toward the bottom of the screen in Japanese Publication No. 62-189415, as shown in FIG. 6. In FIG. 6, bottom area e has been added.

Figure 2:
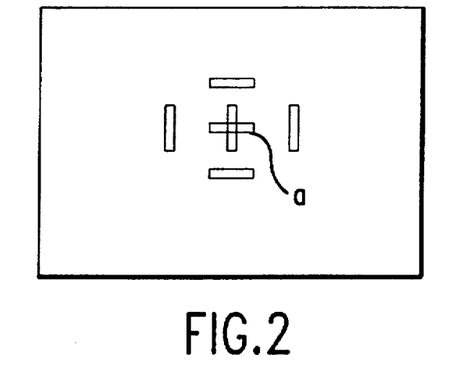
FIG. 2 is a drawing showing an arrangement of focus detecting areas in a focus state detection device capable of detecting focus condition in plural focus detecting areas.

Furthermore, a cross-type arrangement such as that shown in FIG. 2 can be used. Central area a on the optical axis, which has a high frequency of use, can be used to detect the focus condition of a subject extending parallel to either the vertical direction or the horizontal direction.

Figure 3:
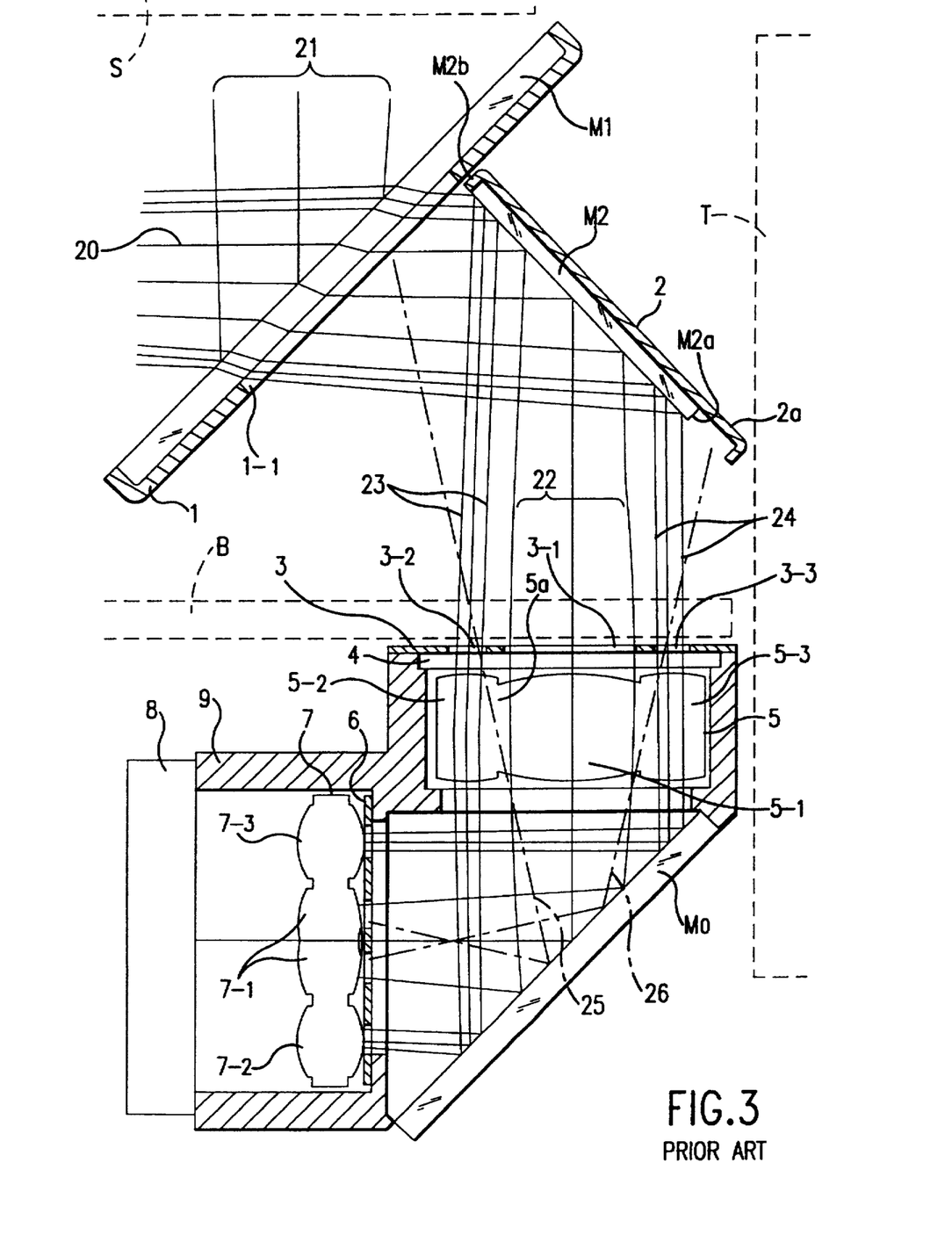
FIG. 3 is a cross-sectional view showing stray light in a focus state detection device capable of detecting focus condition in plural focus detecting areas.

FIG. 3 is a cross-sectional view of a focus state detection optical device having the plurality of focus detecting areas shown in FIG. 2. In a detection state, that is, a viewfinder observation state, light rays that have passed through the photographic lens are divided by partially reflective main mirror M1 into light rays 21 for viewfinder observation and light rays 22–24 for focus detecting in each area. Light rays 21 for observation are reflected in the direction of focusing plate S by main mirror M1. Light rays 22–24 for focus detecting pass through main mirror M1 and are deflected toward bottom B of a mirror box by a completely reflective sub-mirror M2. Mirrors M1 and M2 each are supported by a respective mirror holder 1 and 2, and rotate around respective rotation shafts (not shown) during sequencing of the camera, to dodge photographic light rays. Opening 1—1 is provided in main mirror holder 1 to allow light rays 22–24 to pass to sub-mirror M2 from main mirror M1 for focus detecting.

The basic structure of this focus state detection optical system is generally the same as in FIG. 7. Light rays 22–24 for focus detecting pass through field mask 3 and field lens 5, are deflected toward the photographic lens by deflecting mirror M0, and pass through mask 6 and re-imaging lens 7 to reach CCD line sensor 8. In addition, infrared reduction filter 4 is directly in front of field lens 3 to correct the relative luminosity factor of CCD line sensor 8. Each of these components in the optical system is fixed to detecting focus condition holder 9, and together comprise a detecting focus condition module.

As described above, areas not on the optical axis are provided above and below the optical axis. Consequently, three of the focus state detection optical systems corresponding to these areas are lined up along a cross-sectional plane that includes optical axis 20 of the photographic lens and the optical axes of light rays 22–24 for focus detecting. Field lens 5 comprises three component lens elements 5-1, 5-2 and 5-3, formed together as a single entity. Re-imaging lens 7 includes a pair of component lenses 7-2 and 7-3 in a direction perpendicular to the plane of FIG. 3, corresponding to areas not on the optical axis. These areas extend in the horizontal direction. Re-imaging lens 7 also includes two pairs of component lenses 7-1, corresponding to the central area on the optical axis. One pair is in a direction parallel to the plane of FIG. 3 and one pair is in a direction perpendicular to the plane. The overall area is in the shape of a cross, and all of the lenses are formed together as a single entity.

Stray light harmful to focus detecting is produced in this type of detecting focus condition optical system capable of focus detecting in a plurality of focus detecting areas. For light passing through the apertures of the field mask for the upper and lower areas, stray light passes through field lens 5-1 at the central area from the surface on the side opposite the field mask, as indicated by dashed lines 25 and 26.

Stray light 26 passes through aperture 3—3 of the field mask for the upper area, is incident on field lens 5-3 from the field mask side of the lens, and exits from the exit pupil surface of field lens 5-1 on the side opposite the field mask. Stray light 26 is dispersed by tip M2a of sub-mirror M2 and enters the gap between the tip and shutter T. However, if tip 2a of sub-mirror holder 2 is lengthened relative to sub-mirror M2, as shown in FIG. 3, thereby making the spacing from shutter T extremely small, it is possible to block nearly all stray light 26 incident on field lens 5-3. Accordingly, stray light 26 can be blocked prior to being incident on the focus state detection module.

Stray light 25 passes through aperture 3-2 of the field mask for the lower area, is incident on field lens 5-2 from the field mask side, and exits from the exit pupil surface of field lens 5-1 on the side opposite the field mask. Stray light 25 comprises light that strays toward main mirror M1 from tip M2b of sub-mirror M2 and toward the photographic lens, and which passes through opening 1—1 in main mirror holder I after passing through the partially-reflective main mirror. The light includes light rays of reverse incident light from the viewfinder eyepiece, which pass through nearly the center of the focusing plate S, where reverse incident light is the strongest. Moreover, the areas through which the reverse incident light passes, including both the partially reflective area of main mirror M1 and opening 1—1 in main mirror holder 1, also are areas through which light rays 23 for focus detecting pass. It thus is impossible to block reverse incident light at the main mirror or at the focusing plate.

In addition, stray light 25 overlaps with light rays 22–24 used for focus detecting, which are shown in solid lines, between field lens 5 and re-imaging lens 3. Blocking stray light at this position thus also would block the light used for focus detecting. It is impossible, therefore, to block only stray light with the light-blocking plate of U.S. Pat. No. 4,857,718. Overlap between stray light and the light used for focus detecting in the central area on the optical axis occurs more easily when the central area on the optical axis is in the shape of a cross. Overlap also occurs more easily for-large widths of focus detecting light rays 22 in the central area on the optical axis in the plane of FIG. 3.

Stray light 25 is produced by a plurality of field lenses formed as a single entity for the different detecting focus condition blocks. Light incident on the field lens from the field mask side enters a region of the field lens of a focus state detection block corresponding to an area adjacent to the area the light was incident on within the field lens. The light emerges from the exit pupil surface of a field lens corresponding to an area different from the area in which the light entered.

SUMMARY OF THE INVENTION

Therefore, it is an object of embodiments of the present invention to effectively block stray light that enters a central area, in a focus state detection device capable of detecting focus condition in a plurality of focus detecting areas and having upper and lower areas not on the optical axis, in particular in a field lens formed as a single entity.

In accordance with the above and other objects, embodiments of the present invention prevent stray light, by separating a single field lens at a location where stray light is produced. This stray light cannot be blocked by using a light-blocking plate, for example.

With embodiments of the present invention, the field lens is separated at the place where it meets the optical path of the stray light rays. Because the surface where it is divided is a planar surface essentially parallel to the main light rays used for focus detecting, stray light inclined even slightly from the main light rays will be incident on the separation plane at an extremely large angle of incidence. This causes complete reflection by the separation plane and prevents the light from entering the field lens of the adjacent area.

DETAILED DESCRIPTION OF PREFERRED EMBODIMENTS

Figure 1:
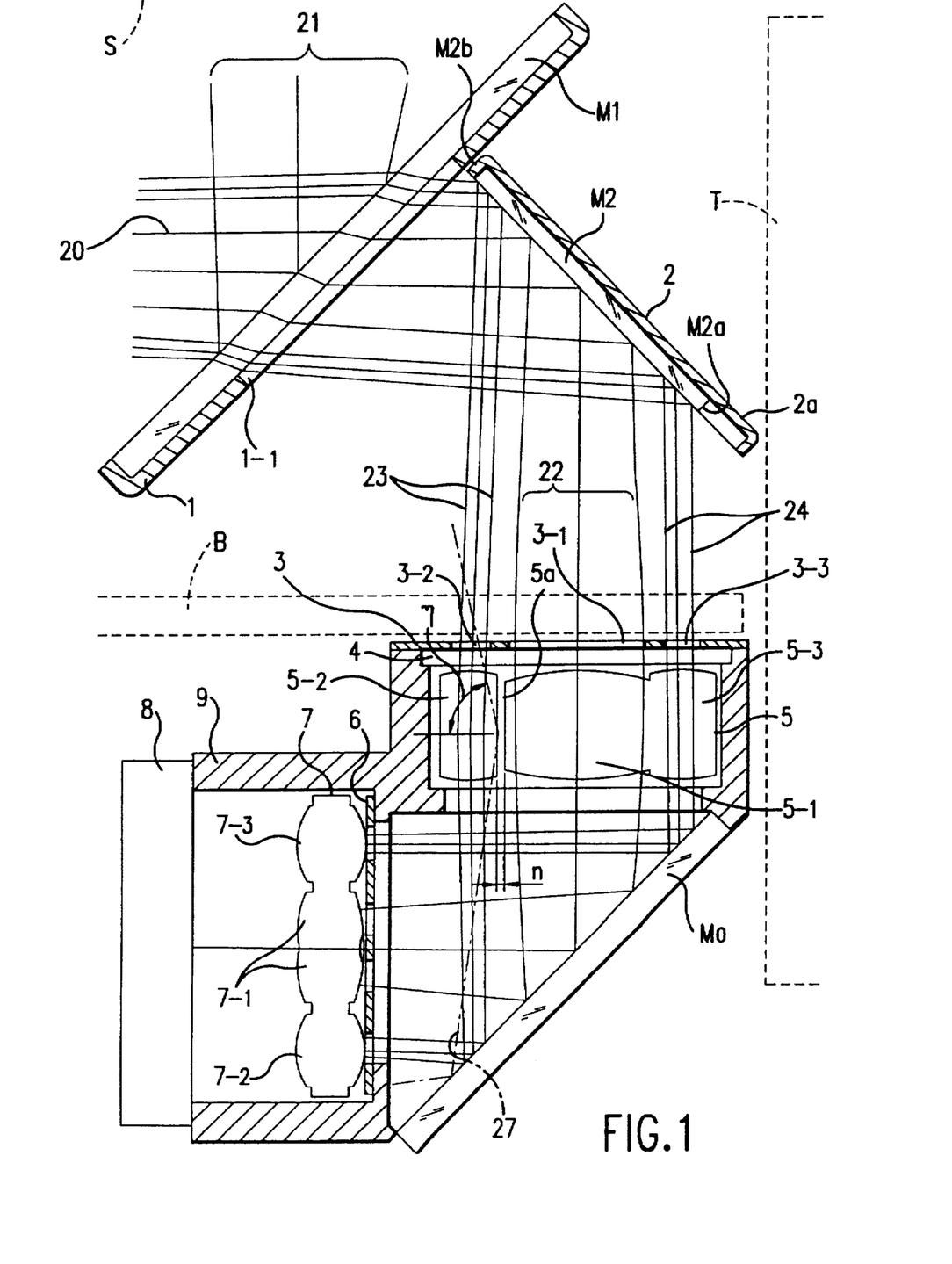
FIG. 1 is a cross-sectional view showing an embodiment of the present invention.

FIG. 1 shows a cross-section of a focus state detection device according to an embodiment of the present invention. The FIG. 1 focus state detection optical system is somewhat similar to the system of FIG. 3, and elements in FIG. 1 that correspond to elements in FIG. 3 are identified with identical symbols. To prevent stray light from entering the optical path of a different area inside the field lens, field lens 5-1 corresponding to the central area is separated from field lens 5-2 corresponding to the lower area. The lenses are positioned with a small spacing "n" between them.

With the FIG. 1 embodiment, the optical path defined by light rays 27 has the same initial angular orientation as the optical path defined by light rays 25 of FIG. 3. The optical path is the same as in the previous description, from the point where it passes through partially reflective main mirror M1 to the point where it is incident on the surface of field lens 5-2 for the lower area. However, because field lens 5-2 is separated by a small spacing "n" from field lens 5-1 for the adjacent central area, an exterior surface 5a is formed essentially parallel to the direction of light rays 23 near the region where focus detecting light rays 23 pass. The direction of light rays 27 is slightly askew from the direction of light rays 23. Consequently, the angle of incidence η of these light rays 27 on the exterior surface 5a is large, on the order of about 60°–80°. This angle of incidence exceeds the critical angle of about 41.8°, when the refractive index of the field lens is 1.5. Accordingly, light rays 27 are completely reflected by the exterior surface 5a, and consequently do not leave field lens 5-2 from the exterior surface. Thus, these light rays 27 do not enter the adjacent field lens 5-1, and do not become harmful stray light rays.

In addition, after light rays 27 have been reflected by the exterior surface 5a, they leave field lens 5-2 through an exit surface. The complete reflection of light rays 27 by exterior surface 5a causes the direction of light rays 27 to shift in an opposite direction, relative to optical axis 20, as the direction of light rays 23 for focus detecting. Consequently, after being reflected by reflection mirror M0, light rays 27 are outside light rays 22–24 used for focus detecting, and do not enter the aperture of mask 6 for the lower area.

The above-described field lens structure is not limited to use between the central area and the upper and lower areas relative to the optical axis. This structure is also effective for separating the field lens central area from the field lens left and right areas, because the same kind of stray light also can be produced between the left and right areas when the separation between areas is small. However, the field lenses for areas where no separation is needed are kept as a single entity, to reduce the number of components.

With the above invention, a space is provided to separate two adjacent field lenses. Harmful stray light rays caused by light entering the region of a different area inside the field lens can be prevented without the use of a light-blocking plate.

While this invention has been described in conjunction with specific embodiments, many alternatives, modifications and variations will be apparent to those skilled in the art. Accordingly, preferred embodiments of the invention as set forth herein are intended to be illustrative, not limiting. Various changes may be made without departing from the spirit and scope of the invention as set forth in the appended claims.

What is claimed is:

1. A focus detection device having a sensor for detecting focus in at least two regions of an image field, the device comprising:

a photographic lens for receiving light from a source in the image field; and field lens means for receiving light from the photographic lens and for deflecting stray light away from the sensor, the field lens means being disposed between the photographic lens and the sensor, the field lens means comprising adjacent field lens elements for receiving light from the regions of the image field, the adjacent field lens elements being separated by a space to deflect the stray light, each adjacent field lens element having at least one exterior surface to deflect the stray light away from the sensor.

2. The device of claim 1, wherein the adjacent field lens elements comprise:

first field lens element means for receiving light from a first image field region disposed at a central portion of the image field, an optical axis of the photographic lens passing through the first image field region; and second field lens element means for receiving light from a second image field region disposed at a side of the first image field region.

3. The device of claim 1, wherein the adjacent field lens elements comprise independent, separated lenses.

4. The device of claim 1, wherein the field lens means further comprises an abutting field lens element that abuts one of the adjacent field lens elements.

5. The device of claim 4, wherein:

the one adjacent field lens element corresponds to a first image field region at a central portion of the image field, an optical axis of the photographic lens passing through the first image field region; and the abutting field lens element corresponds to a second image field region disposed at a side of the first image field region.

6. The device of claim 4, wherein the abutting field lens element is one-piece with the one adjacent field lens element.

7. The device of claim 1, wherein one of the adjacent field lens elements includes a lens surface bordering the space separating the adjacent field lens elements, stray light within said one adjacent field lens element being reflected by the lens surface to deflect the stray light.

8. A focus detection device having a sensor for detecting focus in at least two regions of an image field, the device comprising:

a photographic lens that receives light from a source in the image field; and a field lens that receives light from the photographic lens and deflects stray light away from the sensor, the field lens being disposed between the photographic lens and the sensor, the field lens comprising a plurality of field lens elements that receive light from the regions of the image field, at least two of the field lens elements being adjacent field lens elements corresponding to adjacent regions of the image field, the adjacent field lens elements being separated by a space and each having at least one exterior surface to deflect the stray light away from the sensor.

9. The device of claim 8, wherein the adjacent field lens elements comprise:

a first field lens element corresponding to a first image field region disposed at a central portion of the image field, an optical axis of the photographic lens passing through the first image field region; and a second field lens element corresponding to a second image field region disposed at a side of the first image field region.

10. The device of claim 8, wherein the adjacent field lens elements comprise independent, separated lenses.

11. The device of claim 8, wherein the plurality of field lens elements further comprises an abutting field lens element that abuts one of the adjacent field lens elements.

12. The device of claim 11, wherein:

the one adjacent field lens element corresponds to a first image field region at a central portion of the image field, an optical axis of the photographic lens passing through the first image field region; and the abutting field lens element corresponds to a second image field region disposed at a side of the first image field region.

13. The device of claim 11, wherein the abutting field lens element is one-piece with the one adjacent field lens element.

14. The device of claim 8, wherein one of the adjacent field lens elements includes a lens surface bordering the space separating the adjacent field lens elements, stray light within said one adjacent field lens element being reflected by the lens surface to deflect the stray light.

15. A method of detecting focus in at least two regions of an image field in a device having a photographic lens, the method comprising:

transmitting light from the photographic lens to adjacent field lens elements of a field lens, the adjacent field lens elements corresponding to adjacent regions of the image field in which focus is detected, the adjacent field lens elements being separated by a space;

deflecting stray light within one of the adjacent field lens elements from a surface bordering the space separating the adjacent field lens element to a position away from a sensor; and transmitting light from the field lens elements of the field lens to the sensor to detect focus in the image field.

16. The method of claim 15, further comprising:

transmitting light from a first image field region at a central portion of the image field to one of the adjacent field lens elements, an optical axis of the photographic lens passing through the first image field region; and transmitting light from a second image field region to another of the adjacent field lens elements, the second image field region being disposed at a side of the first image field region.

* * * * *